(12) United States Patent
Ruppert

(10) Patent No.: US 12,542,472 B2
(45) Date of Patent: Feb. 3, 2026

(54) ELECTRICAL CIRCUIT DEVICE FOR OPERATING AN EXTERNALLY EXCITED ELECTRICAL MACHINE, ELECTRICAL DRIVE APPARATUS, AND MOTOR VEHICLE

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 289 days.

(21) Appl. No.: 18/183,879

(22) Filed: Mar. 14, 2023

(65) Prior Publication Data

US 2023/0299649 A1    Sep. 21, 2023

(30) Foreign Application Priority Data

Mar. 16, 2022 (DE) ........................ 102022106061.6

(51) Int. Cl.
| | |
|---|---|
| *H05K 7/20* | (2006.01) |
| *H02K 5/20* | (2006.01) |
| *H02K 11/33* | (2016.01) |
| *H03H 1/00* | (2006.01) |

(52) U.S. Cl.
CPC ............ *H02K 11/33* (2016.01); *H02K 5/20* (2013.01); *H03H 1/0007* (2013.01); *H02K 2211/03* (2013.01); *H03H 2001/0014* (2013.01)

(58) Field of Classification Search
CPC ...... H02K 11/33; H02K 5/20; H02K 2211/03; H03H 1/0007; H03H 2001/0014
USPC ........................................................ 361/718
See application file for complete search history.

(56) References Cited

U.S. PATENT DOCUMENTS

| | | | |
|---|---|---|---|
| 11,749,580 B2* | 9/2023 | Ruppert ................ | H01L 23/473 257/712 |
| 2017/0237358 A1* | 8/2017 | Kraus ................... | H02M 7/003 361/702 |
| 2021/0092882 A1* | 3/2021 | Ruppert ................. | H01L 23/36 |
| 2021/0175144 A1* | 6/2021 | Ruppert ................. | H01L 25/16 |
| 2021/0313920 A1* | 10/2021 | Brüske ................... | B60L 15/20 |
| 2022/0381806 A1* | 12/2022 | Ruppert ............ | H02M 7/53873 |
| 2023/0143379 A1* | 5/2023 | Ruppert ................ | H02M 1/327 363/131 |
| 2023/0262943 A1* | 8/2023 | Ruppert ............. | H05K 7/20509 361/707 |

FOREIGN PATENT DOCUMENTS

| | | |
|---|---|---|
| CN | 102029957 A | 4/2011 |
| DE | 102019125733 A1 | 3/2021 |
| DE | 102019128721 A1 | 4/2021 |
| DE | 102019132685 A1 | 6/2021 |

OTHER PUBLICATIONS

DE 102019132685 A1 English translation (Year: 2021).*

* cited by examiner

*Primary Examiner* — Anatoly Vortman
(74) *Attorney, Agent, or Firm* — Seed Intellectual Property Law Group LLP

(57) ABSTRACT

An electrical circuit device for operating an externally excited electrical machine includes an exciter circuit, an inverter circuit, a capacitor, and a support structure. The exciter circuit includes at least one exciter circuit module arranged on a first side surface of the support structure. The at least one exciter circuit module includes at least one direct current terminal that is connected directly to a terminal of the capacitor.

9 Claims, 4 Drawing Sheets

ELECTRICAL CIRCUIT DEVICE FOR OPERATING AN EXTERNALLY EXCITED ELECTRICAL MACHINE, ELECTRICAL DRIVE APPARATUS, AND MOTOR VEHICLE

BACKGROUND

Technical Field

The disclosure relates to an electrical circuit device for operating an externally excited electrical machine comprising an exciter circuit, an inverter circuit, a capacitor and a support structure, wherein the exciter circuit comprises at least one exciter circuit module arranged on a side surface of the support structure. Furthermore, the disclosure relates to an electrical drive apparatus and a motor vehicle.

Description of the Related Art

Electrical circuit devices can be used for example to operate externally excited electrical machines. For this, a stator of the electrical machine is energized with an alternating current, generated from a direct current, by an inverter circuit of an electrical switch device. Furthermore, an exciter current can be generated from the direct current with the aid of an exciter circuit and used to energize an exciter winding or a rotor winding of the electrical machine. In this way, an externally excited electrical machine can be operated by the electrical circuit device.

In order to form the electrical circuit device, the various circuit components can be arranged for example on a common support structure, so that the electrical circuit device is designed as a single module. Between the components of the electrical circuit device, electrical connections need to be provided, for example, in order to make possible a connecting of the electrical circuit device to the electrical machine and/or to an energy source. Moreover, components associated with the inverter circuit and/or the exciter circuit such as filtering devices like capacitors must also be electrically connected to or switched together with the inverter circuit and/or the exciter circuit. In this regard, it is known for example how to connect an exciter circuit by cable to one or more other components of the electrical circuit device. Various approaches are known in the prior art for the formation of electrical circuit devices.

In DE 10 2019 125 733 A1 there is described a power module for electrical drives. The power module comprises at least one exciter circuit having at least one power semiconductor, the power module being molded or cast and the exciter circuit being integrated with the at least one power semiconductor in the molded power module. An electrical contacting of the exciter circuit module occurs by contact pins sticking out perpendicularly from the molded housing. Furthermore, the power module comprises a traction inverter and a water-cooled main heat dissipater, on which the circuit modules of the traction inverter and the exciter circuit module are arranged.

In DE 10 2019 128 721 A1 there is described a power electronics device for an externally excited synchronous machine. The power electronics device comprises a number of inverter modules, corresponding to the number of phases of the synchronous machine. The inverter modules are thermally connected to a cooling device carrying a cooling agent. The exciter module is also thermally connected to the cooling device. There is an electrical connection of the exciter circuit to a high-voltage direct current network of a motor vehicle, which is energized from a high-voltage battery.

From CN 102029957 A there is known an electrical circuit device for a hybrid vehicle. The electrical circuit device here comprises an exciter controller and an inverter circuit for operating an electrical traction motor of the motor vehicle. The different components of the electrical circuit device are arranged in a common housing, while the actuating of the components is done by a Controller Area Network (CAN) bus.

BRIEF SUMMARY

Embodiments of the invention provide an improved electrical circuit device which makes possible in particular an improved electrical integration of an exciter circuit module in the electrical circuit device.

In an electrical circuit device of the kind mentioned above it is proposed according to an embodiment of the invention that the exciter circuit module comprises at least one direct current (DC) terminal which is connected directly to a terminal of the capacitor.

The exciter circuit can be formed by the exciter circuit module or it can contain still further components and/or circuits besides the exciter circuit module. In particular, the exciter circuit is designed as a DC voltage converter (DC/DC converter). The exciter circuit module can comprise, for example, a full bridge, an asymmetrical full bridge or a quasi-full bridge or a similar circuit making it possible to convert a direct current received via the direct current terminal of the exciter circuit module into an exciter current for energizing the exciter winding. Depending on the configuration of the exciter circuit, this can dictate and/or change an exciter voltage or an exciter current strength and/or a direction of flow of the exciter current.

The exciter circuit module is electrically connected across the at least one direct current terminal to the capacitor. The direct current terminal here represents in particular the input of the exciter circuit in relation to the energization of the exciter winding. At the output side, the exciter circuit can be connected to the exciter or rotor winding of the electrical machine, for example, across slip ring contacts.

The direct current terminal can be configured as a terminal tab, which sticks out from a housing of the exciter circuit module and can be electrically contacted from outside the exciter circuit module. The exciter circuit module can be a cast or molded component, so that the housing can be formed by a casting compound, from which the direct current terminal is led out for the contacting of circuit components situated inside the exciter circuit module. For example, the direct current terminal can consist of a conductive metal. The exciter circuit module can have in particular two direct current terminals, which are respectively connected to another terminal of the capacitor.

The capacitor can be, for example, an intermediate circuit capacitor, which besides the at least one direct current connection of the exciter circuit module is also connected to the direct current side of the inverter circuit. The capacitor can be hooked up in particular as a X-capacitor and serve for the filtering of interference in a DC voltage intermediate circuit. The terminal of the capacitor can be, for example, a terminal tab sticking out from a capacitor housing of the capacitor or a terminal surface on the capacitor housing. The terminal of the capacitor can consist for example of a conductive metal.

The direct current terminal of the exciter circuit module is connected directly to the terminal of the capacitor, that is, the direct current terminal is situated in direct contact with the terminal of the capacitor. No other electrical connection structure can be hooked up between the direct current terminal of the exciter circuit module and the terminal of the capacitor, such as a cable or the like.

The direct connection between direct current terminal of the exciter circuit module and the terminal of the capacitor can be such, in particular, that the direct current terminal is permanently attached to the terminal, while the connection can be detachable or non-detachable. With the aid of the direction connection, a high degree of integration of the exciter circuit module or the exciter circuit within the electrical circuit device can be achieved.

By providing the direct connection between the direct current terminal of the exciter circuit module and the terminal of the capacitor, a robust contacting of the exciter circuit in the electrical circuit device becomes possible, which can have advantages in terms of the service life of the electrical circuit device. Advantageously, the direct connection of the direct current terminal of the exciter circuit module to the terminal of the capacitor avoids the use of long cable laying in the electrical circuit device.

The elimination of cables can improve the behavior of the electrical circuit device, especially the exciter circuit, in terms of electromagnetic compatibility of the electrical circuit device or its components. In this way, hard to produce filtering procedures and/or dampening procedures are unnecessary, or these procedures will only be required to a slight extent. Furthermore, the omitting of long cable laying inside the electrical circuit device enables boosted efficiency of the electrical circuit device, since less interference occurs and wiring resistances can be reduced.

Advantageously, the production costs of the electrical circuit device can also be reduced, since it is not necessary to provide any cables or cable shoes and furthermore their connection during the course of the production, such as a crimping of the cable shoes or a laying of the cables, is unnecessary. This advantageously simplifies the handling of the components during the assembly of the electrical circuit device. Moreover, with a direct connection, neither are any plugs or plug connectors required for the connection of the terminals by a cable.

Furthermore, the direct connection makes it possible to avoid stray inductances between the capacitor of the electrical circuit device and the exciter circuit module, such as may occur for example due to cable connections. In this way, it is also possible to reduce voltage overshoots of the output voltage of the switching elements of the exciter circuit module upon switching of the switching elements between an opened and a closed state. In this way it is also possible to reduce or totally eliminate further filter measures, for example X-capacitances arranged in direct proximity to the switching elements of the exciter circuit.

Stray inductances can furthermore produce an electrical oscillatory circuit with the capacitor of the electrical circuit device and/or other capacitors in the exciter circuit. Such oscillatory circuits may require compensation measures by additional dampening resistors and/or X-capacitances in the electrical circuit device, for example near electronic switching elements in the exciter circuit. The direct connection between the direct current terminal of the exciter circuit and the terminal of the capacitor makes it possible to avoid such measures or to use them only in a reduced degree.

Furthermore, negative effects of such oscillatory circuits, such as an unwanted current amplification by a resonance between two direct current intermediate circuits coupled across the capacitor, can also be avoided. In particular, it is possible to prevent resonances between a so-called small intermediate circuit inside the electrical circuit device, i.e., between the capacitor and the exciter circuit and/or the inverter circuit, and a so-called large intermediate circuit between capacitor and a direct current network connected to the direct current side of the electrical circuit device. Moreover, it is also possible to avoid impairments or excessive aging effects which may arise due to such resonances, which has a particularly positive impact on the service life of the electrical circuit device. Moreover, the preventing of such resonances makes possible fewer losses in the exciter circuit, which has an advantageous effect on boosting the efficiency of the electrical circuit device.

Improved behavior of the exciter circuit in terms of electromagnetic compatibility of the electrical circuit device makes it possible to use a smaller size or lower capacitance of the input capacitances of the exciter circuit used for the filtering, such as X-capacitances, or to eliminate these entirely. This increases the noise immunity of the electrical circuit device, which can advantageously reduce the likelihood of disruptions and/or failures.

The reduction or elimination of filtering measures also has the advantageous consequence of a lowering of the production costs thanks to savings on filter components or the possibility of using smaller components, as well as improved robustness of the electrical circuit device. Furthermore, the elimination and/or less performance of the filter measures also lowers the expense on development of the electrical circuit device and the design space required by the electrical circuit device.

Elimination or reduction of the filter measures furthermore results in a lowering of the power losses in the electrical circuit device and thus a boosting of the efficiency of the electrical circuit device. Especially in the case of an electrical circuit device which is used to operate an externally excited electrical machine being used as a traction motor, the reduction of the power loss makes possible a boosting of the efficiency and thus the achieving of a longer range for a motor vehicle powered by the externally excited electrical machine.

The electrical circuit device can serve in particular for operating an externally excited electrical machine used as the drive or as the traction motor of a motor vehicle. The electrical machine in particular can be designed as an externally excited synchronous machine and it can have for example a three-phase stator, which can be energized across the inverter circuit with an alternating current. The alternating current can be generated by the inverter circuit from a direct current, for example, which is taken from an energy accumulator apparatus and/or an energy source, such as a battery or a fuel cell, connected to the electrical circuit.

The energized winding of the synchronous machine advantageously makes it possible to do without magnetic materials for generating the rotor field. Moreover, an exciter circuit used for the energization of the rotor creates an additional degree of freedom in the regulation and the design of the electrical machine. In particular, when the electrical machine is used for a drive unit, boosted efficiency and/or performance can advantageously be achieved in this way.

According to embodiments of the invention, it can be provided that the exciter circuit module is welded or screwed to the terminal of the capacitor. The welding or the screwing of the direct current terminal of the exciter circuit module to the terminal of the capacitor makes possible a robust electrical connection of the two components. In particular, a welding, which can be done for example by way of laser welding or comparable methods, simplifies the efficient fabrication of the electrical circuit device, for example in the form of a highly automated mass production.

In one advantageous embodiment of the invention it can be provided that the inverter circuit comprises at least one inverter circuit module, wherein the inverter circuit module is arranged on the support structure, especially on the side surface of the support structure. The number of inverter circuit modules can depend, for example, on the number of phases of an alternating current which can be generated by the inverter circuit. In an inverter circuit configured as a three-phase inverter, the inverter circuit can comprise in particular three inverter circuit modules, each of which can comprise a half-bridge, for example. The at least one inverter circuit module of the inverter circuit is likewise arranged on the support structure. In particular, the inverter circuit module can be arranged on the same side surface as the exciter circuit module. Preferably, the exciter circuit module and the inverter circuit module or modules of the inverter circuit can be arranged in a row alongside each other or along a direction of arrangement on the side surface of the support structure.

According to embodiments of the invention, it can be provided that the inverter circuit module has at least one direct current terminal, which is connected directly to a terminal of the capacitor, in particular being welded or screwed to it. In this way, the connection between the capacitor and the inverter circuit module can be designed to be low inductive, robust, and easy to manufacture. In particular, this makes possible a fastening of the direct current terminal of the inverter circuit module and the direct current terminal of the exciter circuit module to the corresponding terminals of the capacitor in a joint process step. The direct current terminal of the inverter circuit module be directly attached or welded or screwed to another, separate terminal of the capacitor or to the terminal of the capacitor where the or a direct current terminal of the exciter circuit module is also attached.

In one advantageous embodiment of the invention it can be provided that the direct current terminal of the exciter circuit module and the direct current terminal of the inverter circuit module point toward the same edge of the side surface and/or protrude beyond the same edge of the side surface. In this way, a compact layout of the electrical circuit device is made possible.

The inverter circuit modules can additionally have one or more alternating current terminals, which point toward a further edge, situated opposite the edge, or which stick out beyond the further, oppositely situated edge. The exciter circuit module can also have one or more exciter current terminals, which can point respectively toward the oppositely situated edge or protrude beyond the oppositely situated edge. Thus, advantageously, the terminals being connected to the electrical machine and the terminals of the electrical circuit device being connected to a direct current network can be arranged on opposite edges of the side surface, so that a compact integration of the electrical circuit device in another device, such as a motor vehicle, is possible.

According to embodiments of the invention, it can be provided that the support structure is a cooling body, especially one with a flow of a cooling fluid through it. The cooling body can be made of metal, for example, and have one or more especially interior situated cooling ducts through which a cooling fluid can flow, i.e., a cooling liquid or a gaseous cooling agent. It is possible for the cooling body to have one or more openings, each time associated with the exciter circuit module or one of the inverter circuit modules, into which cooling structures of the circuit modules can protrude, such as cooling fins or the like arranged on an underside of the respective circuit module, into the cooling body and especially into the cooling ducts running inside the cooling body.

The exciter circuit module arranged on the cooling body and/or the inverter circuit modules arranged on the cooling body are thermally coupled or connected thermally conductively to the cooling body. In this way, the circuit modules can be smaller in design, which can advantageously lower the production costs of the electrical circuit device. Especially as compared to the configuration of the exciter circuit on a circuit board arranged separately from the support structure, the arrangement of the exciter circuit on the support structure can provide a better cooling of the exciter circuit. Furthermore, the cooling body can be connected to an active cooling circuit, so that an efficient dissipation of heat from the exciter circuit module and/or the power circuit modules and thus from the overall electrical circuit device is possible. Furthermore, such a cooling connection also has positive effect on the service life and the robustness of the components of the exciter circuit and the inverter circuit.

According to embodiments of the invention, it can be provided that the capacitor is arranged on the support structure, especially on another side surface of the support structure bordering on the side surface. The further side surface can in particular adjoin the side surface at the edge of the side surface where the direct current terminal of the exciter circuit module and/or the at least one direct current terminal of the inverter circuit module or modules are arranged. In this way, a compact layout of the entire electrical circuit device can be produced, and in particular the connections between the direct current terminals of the exciter circuit module or the at least one inverter circuit module and the capacitor can be short in length, especially thanks to a direct connection of the direct current terminals to terminals of the capacitor configured as terminal tabs or terminal surfaces. This likewise reduces the material outlay during the manufacture of the electrical circuit device and makes possible especially low inductance connections thanks to the short electrical pathways.

In one advantageous embodiment of the disclosure it can be provided that the exciter circuit module and/or the or an inverter circuit module of the inverter circuit each comprise at least one terminal pin, wherein the terminal pin extends perpendicular to the side surface. In particular, the terminal pin sticks out from a side surface or a top side of the respective circuit module perpendicular in the direction situated opposite the support structure. The terminal pin can stand out from a housing, such as a molded housing, of the circuit module. The terminal pin can be for example a press fit pin, making possible an easy assembly of an electrical circuit being connected to the terminal pin, for example a control circuit realized on a circuit board.

According to embodiments of the invention, it can be provided that the terminal pin is connected to at least one control board. In particular, a common control board can be provided for the exciter circuit and the inverter circuit. On the control board there can be provided for example a driver circuit for actuating the exciter circuit module and the power circuit module or for actuating the switching elements present in the circuit modules.

Furthermore, a filter circuit can also be provided on the control board, so that any filter measures required can be realized advantageously outside the exciter circuit module or power modules of the inverter circuit. This can advantageously boost the flexibility when carrying out these filter measures. In particular, the attuning of the filter measures to the switching frequencies and the switching speeds of the switching elements in the inverter circuit and/or in the exciter circuit can thus be simplified, which likewise can contribute to increasing the efficiency and the performance of the electrical circuit device. Trimmable inductances and/or trimmable resistors can be used for the attuning, by which the filtering or dampening behavior of the filter circuit can be adapted flexibly to the electrical circuit device. Thus, advantageously, a filtering of interference in the electrical circuit device can be done, without having to make changes in or provide additional components for the exciter circuit module, the components of the inverter circuit and/or the capacitor.

For an electrical drive apparatus according to the disclosure it is proposed that it comprises an electrical circuit device according to the disclosure and an electrical machine connected to the electrical circuit device. The electrical machine is in particular an externally excited electrical machine, for example an externally excited synchronous machine. The stator of the electrical machine can be connected to the inverter circuit and a rotor winding or exciter winding of the electrical machine can be connected to the exciter circuit.

For a motor vehicle according to the disclosure it is proposed that it comprises at least one electrical drive apparatus according to the disclosure. The electrical machine of the electrical drive apparatus may form a traction electric motor of the motor vehicle. The electrical circuit device can be connected on its direct current side, especially across the capacitor, to a direct current onboard network of the motor vehicle. By the direct current onboard network, the electrical circuit device can be connected to an electrical energy accumulator, such as a traction battery.

The direct current onboard network can be designed in particular as a high-voltage onboard network, such as one having a voltage level between 200 V and 1200 V, for example 800 V. The motor vehicle can be a pure electric vehicle or a hybrid vehicle, such as a plug-in hybrid vehicle. The motor vehicle can have one or more electrical drive apparatus, each time the electrical machines being associated with a wheel or an axle of the motor vehicle.

All of the benefits and embodiments described above in regard to the electrical circuit device according to the disclosure hold accordingly for the electrical drive apparatus according to the disclosure and for the motor vehicle according to the disclosure and vice versa. Also the benefits and embodiments described in regard to the electrical drive apparatus hold accordingly for the motor vehicle according to the disclosure and vice versa.

BRIEF DESCRIPTION OF THE SEVERAL VIEWS OF THE DRAWINGS

Further benefits and details of the disclosure will emerge from the exemplary embodiments described below and with the aid of the drawings. These are schematic representations which show.

DETAILED DESCRIPTION

Figure 1:
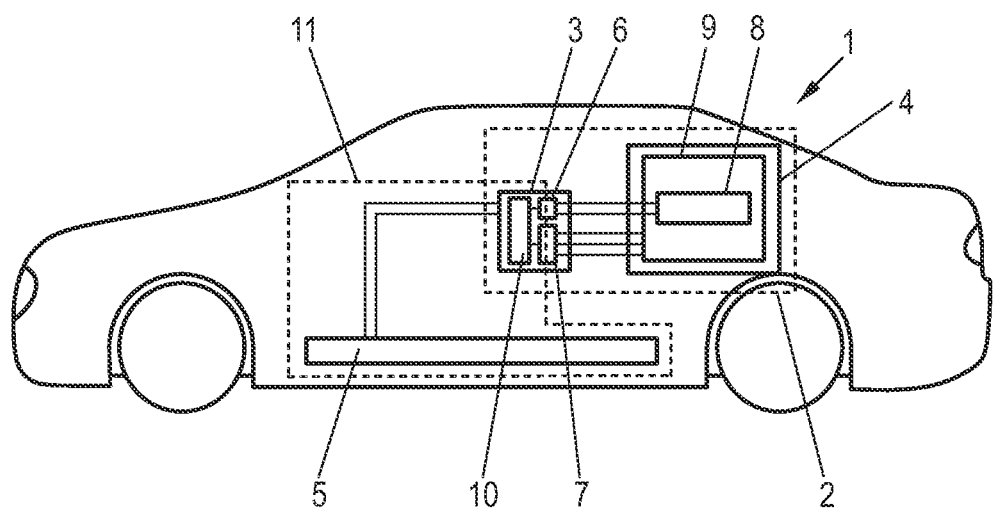
FIG. 1 shows an exemplary embodiment of a motor vehicle according to the disclosure with an exemplary embodiment of an electrical drive apparatus according to the disclosure.

FIG. 1 presents an exemplary embodiment of a motor vehicle 1. The motor vehicle 1 comprises an electrical drive apparatus 2, and the electrical drive apparatus 2 comprises an electrical circuit device 3 as well as an electrical machine 4 connected to the electrical circuit device 3. The electrical machine 4 is designed as an externally excited electrical machine, for example an externally excited synchronous machine, and it forms a traction electric motor of the motor vehicle 1.

For supplying the electrical machine 4 with electrical energy and/or for uptake of energy recuperated via the electrical machine 4, the motor vehicle 1 has an energy accumulator 5, which is designed for example as a traction battery. The energy accumulator 5 is connected to the electrical circuit device 3, the electrical circuit device 3 being designed to operate the electrical machine 4. In addition or alternatively to the energy accumulator 5, the motor vehicle 1 can also have an energy source connected to the electrical circuit device 3, such as a fuel cell.

The electrical circuit device 3 comprises an exciter circuit 6 and an inverter circuit 7, the exciter circuit 6 being connected to a rotor 8 of the electrical machine 4 and the inverter circuit 7 to a stator 9 of the electrical machine 4. Through the exciter circuit 6, an exciter current can be generated, with which the rotor 8 or a rotor or exciter winding of the rotor 8 can be energized. For this, the exciter circuit 6 is designed to convert a direct current taken from the energy accumulator 5 into an exciter current, which can also be a direct current, in particular.

The inverter circuit 7 is adapted to convert a direct current taken from the energy accumulator 5 into a multiphase alternating current, such as a three-phase alternating current, and to energize the stator 9 or a stator winding of the stator 9 with this. In this way, the electrical machine 4 can be operated in a motor mode. Conversely, the inverter circuit 7 can also be adapted to convert in a generator mode of the electrical machine 4 an alternating current generated by the electrical machine 4 into a direct current and to use this for example for the charging of the energy accumulator 5.

The electrical circuit device 3 furthermore comprises a capacitor 10, which is arranged on the direct current side of the inverter circuit 7 or the side of the exciter circuit 6 connected to the electrical energy accumulator 5. This capacitor 10 can also be called an intermediate circuit capacitor and it constitutes a X-capacitor of the electrical circuit device 3 or a direct current subnetwork 11 of the motor vehicle 1. The direct current subnetwork 11 forms an onboard network or an onboard subnetwork of the motor vehicle 1 and can be designed in particular as a high-voltage onboard network, such as one having a voltage level between 200 V and 1200 V, for example 800 V.

Figure 2:
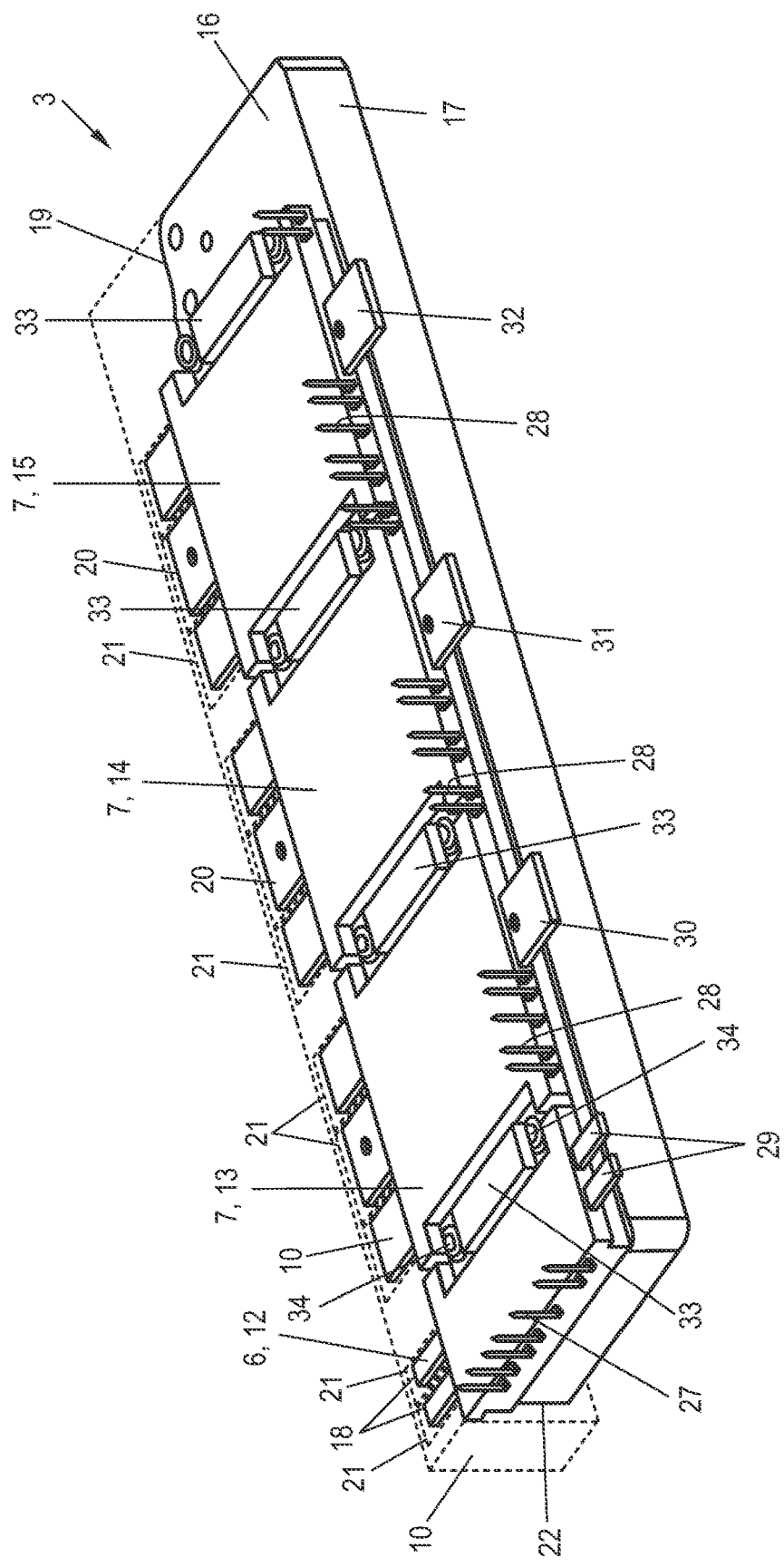
FIG. 2 shows an exemplary embodiment of an electrical circuit device according to the disclosure.

FIG. 2 shows a detailed view of the electrical circuit device 3. The exciter circuit 6 comprises an exciter circuit module 12. Accordingly, the inverter circuit 7 has three inverter circuit modules 13, 14, 15. The exciter circuit module 12 and the inverter circuit modules 13-15 are arranged on one side surface 16 of a support structure 17 of the electrical circuit device 3. The exciter circuit module 12 and the inverter circuit modules 13-15, which are also called collectively the circuit modules 12-15 in the following, are each designed as a molded power electronics module.

The exciter circuit module 12 comprises two direct current terminals 18, which point toward one edge 19 of the support structure 16 and protrude beyond it. The inverter circuit modules 13-15 also comprise respectively three direct current terminals 20, which point toward the same edge 19 of the side surface 16 and likewise protrude beyond it. The direct current terminals 18 of the exciter circuit module 12 are each connected to a terminal 21, designed as a metallic terminal surface, of the capacitor 10, which is shown hatched in the present instance. The direct current terminals 20 of the inverter circuit modules 13-15 are also each connected directly to a terminal 21 of the capacitor 10, designed as a terminal surface. For this, the capacitor 10 is arranged on another side surface 22 of the support structure 16, running perpendicular to the side surface 16 and bordering on the side surface 16 by the edge 19. This allows for short connection pathways between the terminals 21 of the capacitor 10 and the direct current terminals 18, 20 of the circuit modules 12-15.

The direct current terminals 18 of the exciter circuit module 12 and the direct current terminals 20 of the inverter circuit modules 13-15 are each configured as terminal tabs or contact tabs made of a conductive metal and are welded to the terminals 21 of the capacitor 10. Alternatively, it is possible for the terminals 21 of the capacitor 10 to also be configured as terminal tabs, while the direct connection to the direct current terminals 18, 20 can likewise be done by welding or also alternatively by screwing together.

Figure 3:
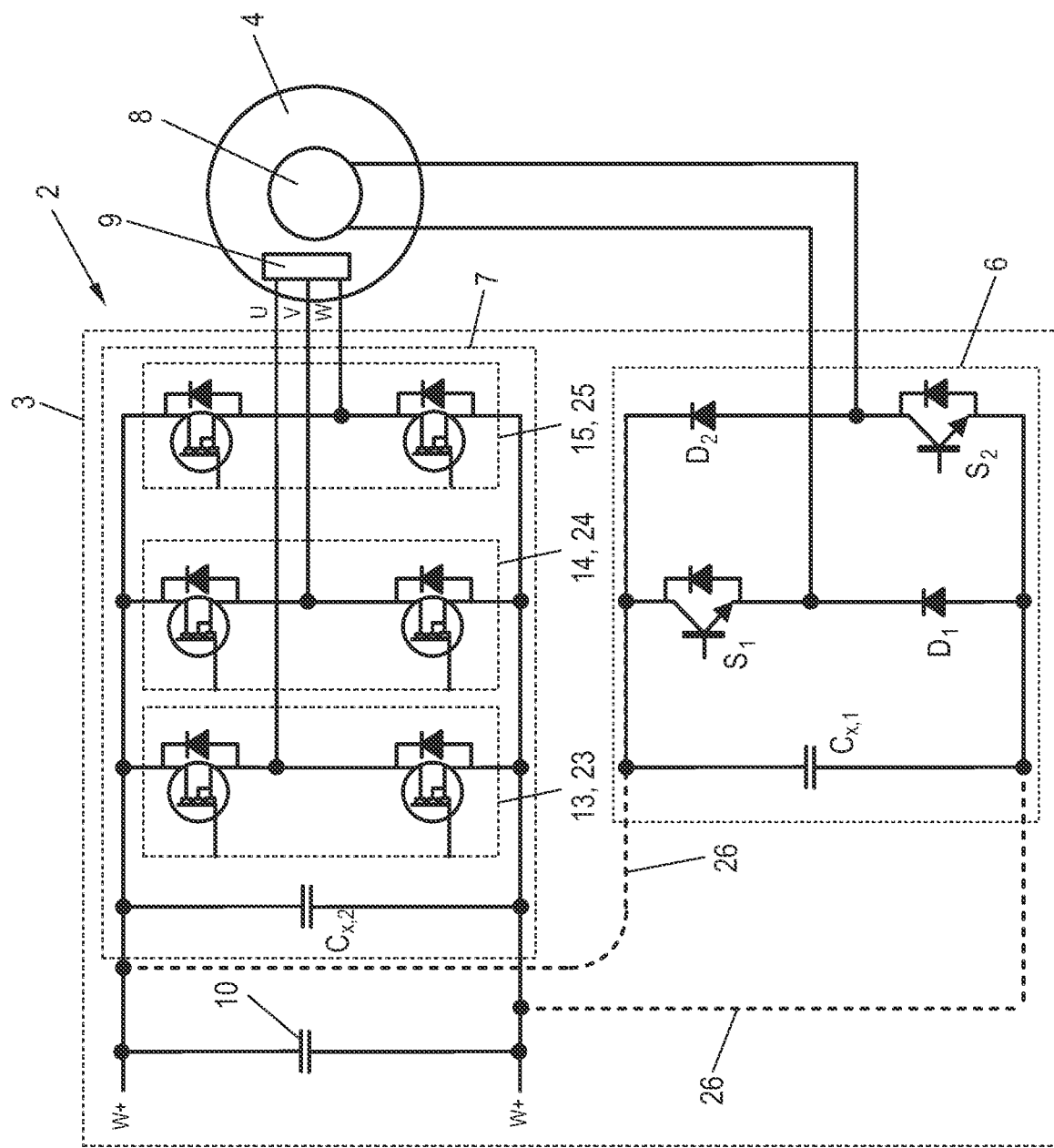
FIG. 3 shows an exemplary embodiment of a schematic circuit diagram of the electrical circuit device according to the disclosure.

FIG. 3 shows a schematic circuit diagram of the electrical circuit device 3 as well as the connection of the electrical circuit device 3 to the electrical machine 4 in order to form the electrical drive apparatus 2. The exciter circuit 6 in the present case is designed as an asymmetrical full bridge or as a quasi-full bridge and it comprises two switching elements S1 and S2, each of which is connected to a diode D1, D2 to form a quasi-half bridge. A bridge arm of the asymmetrical full bridge formed in this way is connected to the rotor 8 of the electrical machine 4.

The inverter circuit 7 comprises three half-bridges 23, 24, 25, each realized by one of the inverter circuit modules 13, 14, 15. Each time, one of the phases U, V, W of a three-phase alternating current generated by the inverter circuit 7 can be picked off at the respective bridge points of the half-bridges 23, 24, 25 and taken to the stator 9 of the electrical machine 4.

A schematically represented direct connection 26 between the exciter circuit 6 and the capacitor 10 is produced by welding or screwing the direct current terminals 18 of the exciter circuit module 12 to the terminals 21 of the capacitor 10, as described above. Because of the direct connection 26 and the consequent short connection distances, it is possible for example to design filter capacitances $C_{x,1}$ of the exciter circuit 12 and/or filter capacitances $C_{x,2}$ of the inverter circuit 7 with a lower capacitance and thus more economically as compared to a wired connection between the direct current terminals 18 and the capacitor 10. Alternatively, the filter capacitances $C_{x,1}$ of the exciter circuit 12 and/or the filter capacitances $C_{x,2}$ of the inverter circuit 7 can also be omitted. Through two terminals, the electrical circuit device 3 and thus also the exciter circuit 6 and the inverter circuit 7 are connected or can be connected to the direct current onboard subnetwork 11 or the electrical energy accumulator 5 of the motor vehicle 1.

Figure 4:
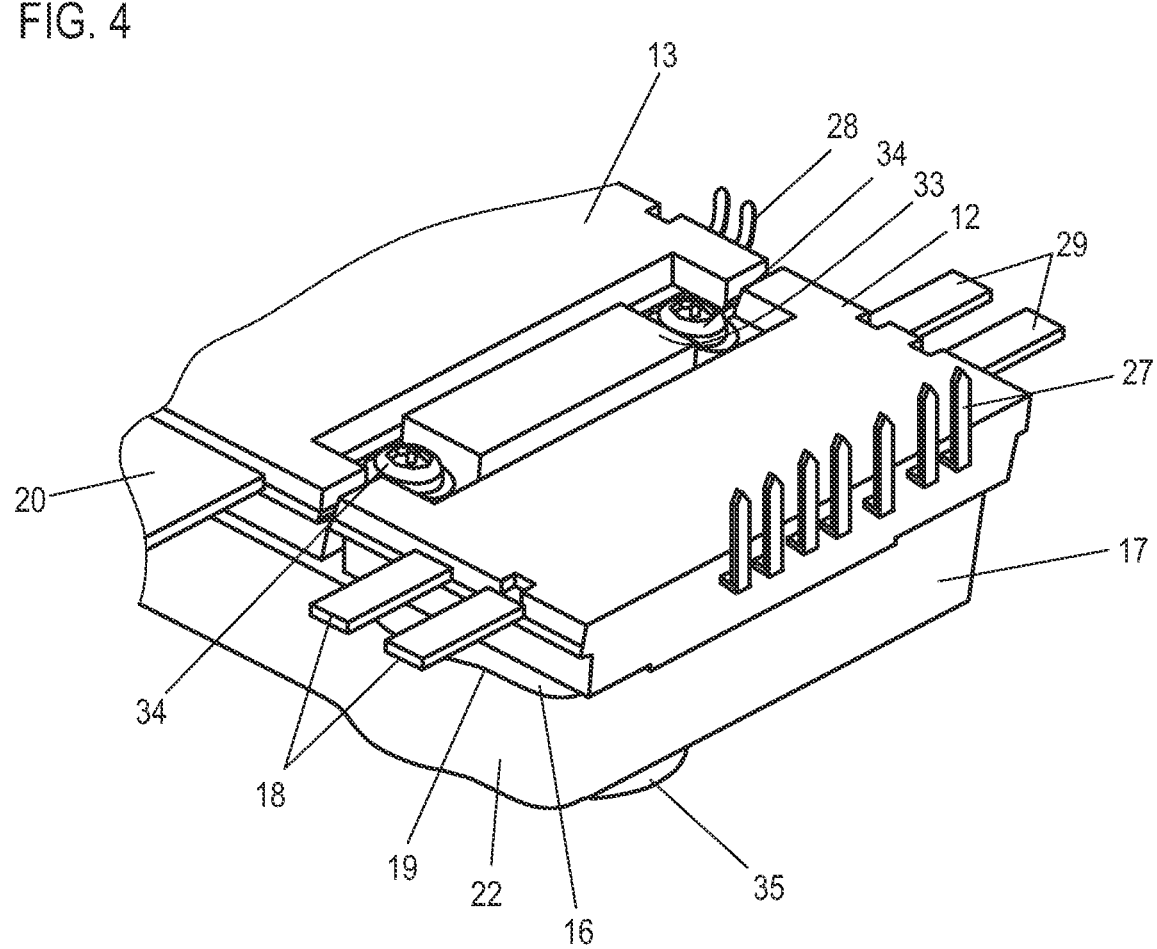
FIG. 4 shows an exemplary embodiment of a detailed view of the electrical circuit device according to the disclosure.

FIG. 4 shows a detailed view of the electrical circuit device 3. For reasons of clarity, the capacitor 10 arranged on the other side surface 22 of the support structure 16 is not shown. The exciter circuit module 12 comprises multiple terminal pins 27, which stand perpendicular to the side surface 16 of the support structure 17. By these terminal pins 27, the exciter circuit module 12 can be connected to a control board (not represented) arranged on the exciter circuit module 12 at the opposite side of the support structure 17. The inverter circuit modules 13-15 can also each have one or more terminal pins 28, in particular as is also shown in FIG. 2. The terminal pins 27, 28 of the circuit modules 12-15 can be designed for example as press fit pins. The inverter circuit modules 13-15 can thus also be connected to the control board. In this way, the exciter circuit module 12 and the inverter circuit modules 13-15 can be actuated by a common control board. Alternatively, different control boards can also be used.

As is also shown in FIG. 2, the exciter circuit module 12 has two exciter current terminals 29 at the side situated opposite the direct current terminals 18, by way of which the exciter circuit module 12 can be connected to the exciter winding of the rotor 8 of the electrical machine 4. The inverter circuit modules 13-15 also each have on this side an alternating current terminal 30-32, through which each time one of the phases U, V, W of the three-phase alternating current can be taken to the stator 9 of the electrical machine 4. The fastening of the exciter circuit module 12 and the power circuit modules 13 is done by fastening clamps 33, which are secured by way of screw fasteners 34 to the support structure 17.

The support structure 17 is designed as a cooling body, having on its inside one or more cooling ducts to carry a cooling fluid, such as cooling water or a cooling air stream. For this, the support structure 17 can have one or more ports 35, by which it can be connected to a cooling circuit of the motor vehicle 1. Thus, an active cooling of the exciter circuit module 12 and the power circuit modules 13, 14, 15 can occur. For this, the circuit modules 12-15 are each thermally coupled to the side surface 16 of the support structure 17, so that waste heat arising during the operation can be dissipated by the support structure 17 configured as a cooling body. The thermal coupling can be produced for example by a heat-conducting layer between a bottom side of the circuit modules 12-15 and the side surface 16. In addition or alternatively, it is possible for the support structure 17 configured as a cooling body to have one or more openings in the side surface 16, each of them associated with the exciter circuit module 12 or one of the inverter circuit modules 13-15, in which cooling structures of the circuit modules 12-15, such as cooling fins or the like arranged on a bottom side of the respective circuit module 12-15 for example, can protrude into the support structure 17 and especially into the cooling ducts running inside the support structure 17.

German patent application no. 102022106061.6, filed Mar. 16, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electrical circuit device for operating an externally excited electrical machine, the electrical circuit device comprising:
   an exciter circuit;
   an inverter circuit;
   a capacitor; and
   a support structure, wherein the support structure is a cooling body through which a cooling fluid flows during operation of the cooling body,
   wherein the exciter circuit includes at least one exciter circuit module arranged on a first side surface of the support structure,
   wherein the at least one exciter circuit module includes at least one first direct current terminal on the first side surface of the support structure,
   wherein the at least one first direct current terminal of the at least one exciter circuit module is in direct contact with a terminal of the capacitor, and
   wherein no other electrical connection structure is provided between the at least one first direct current terminal of the at least one exciter circuit module and the terminal of the capacitor.

2. The electrical circuit device according to claim 1, wherein the at least one exciter circuit module is welded or screwed to the terminal of the capacitor.

3. The electrical circuit device according to claim 1, wherein the inverter circuit includes at least one inverter circuit module, and wherein the at least one inverter circuit module is arranged on the support structure, on the first side surface of the support structure.

4. The electrical circuit device according to claim 3, wherein the at least one inverter circuit module has at least one second direct current terminal that is connected directly to the terminal of the capacitor, by being welded or screwed to the terminal of the capacitor.

5. The electrical circuit device according to claim 4, wherein the at least one first direct current terminal of the at least one exciter circuit module and the at least one second direct current terminal of the at least one inverter circuit module point toward a same edge of the first side surface of the support structure or protrude beyond the same edge of the first side surface of the support structure.

6. The electrical circuit device according to claim 1, wherein the capacitor is arranged on the support structure, on a second side surface of the support structure, wherein the second side surface of the support structure borders the first side surface of the support structure.

7. The electrical circuit device according to claim 1, wherein the at least one exciter circuit module or at least one inverter circuit module of the inverter circuit each comprise at least one terminal pin, wherein the terminal pin extends perpendicular to the first side surface of the support structure.

8. An electrical drive apparatus comprising:
   an electrical circuit device; and
   an electrical machine connected to the electrical circuit device,
   wherein the electrical circuit device includes:
      an exciter circuit;
      an inverter circuit;
      a capacitor; and
      a support structure,
   wherein the support structure is a cooling body through which a cooling fluid flows during operation of the cooling body,
   wherein the exciter circuit includes at least one exciter circuit module arranged on a first side surface of the support structure,
   wherein the at least one exciter circuit module includes at least one direct current terminal arranged on the first side surface of the support structure,
   wherein the at least one direct current terminal of the at least one exciter circuit module is in direct contact with a terminal of the capacitor, and
   wherein no other electrical connection structure is provided between the at least one first direct current terminal of the at least one exciter circuit module and the terminal of the capacitor.

9. The electrical drive apparatus according to claim 8, wherein the electrical drive apparatus is included in a motor vehicle.

* * * * *